United States Patent [19]

Siegel et al.

[11] 4,138,542
[45] Feb. 6, 1979

[54] POLYMERS WHICH CONTAIN 2-(4-METHYL-CYCLOHEX-3-EN-1-YL)-PROPYL-N-ACRYLAMIDE OR -N-METHACRYLAMIDE GROUPS

[75] Inventors: Hardo Siegel, Speyer; Herbert Naarmann, Wattenheim, both of Fed. Rep. of Germany

[73] Assignee: BASF Aktiengesellschaft, Ludwigshafen, Fed. Rep. of Germany

[21] Appl. No.: 901,236

[22] Filed: Apr. 28, 1978

[30] Foreign Application Priority Data

May 20, 1977 [DE] Fed. Rep. of Germany ....... 2722956

[51] Int. Cl.$^2$ ............................................. C08F 20/54

[52] U.S. Cl. ..................................... 526/305; 260/874; 260/897 B; 428/500; 428/511

[58] Field of Search ......................................... 526/305

[56] References Cited

U.S. PATENT DOCUMENTS

| 2,790,789 | 4/1957 | Miller | 526/305 |
| 3,551,373 | 12/1970 | Szita et al. | 526/305 |

Primary Examiner—Harry Wong, Jr.
Attorney, Agent, or Firm—Keil & Witherspoon

[57] ABSTRACT

Polymers in which the side branches contain optically active 2-(4-methyl-cyclohex-3-en-1-yl)-propyl groups, and their preparation. The new polymers are used for the production of moldings, coatings and adhesives, and for finishing paper or textiles. They have K values of from 20 to 140.

2 Claims, No Drawings

POLYMERS WHICH CONTAIN 2-(4-METHYL-CYCLOHEX-3-EN-1-YL)-PROPYL-N-ACRYLAMIDE OR -N-METHACRYLAMIDE GROUPS

The present invention relates to new polymers and to a process for their preparation.

It is an object of the present invention to provide polymers which contain optically active groups, are stable to hydrolysis and contain a reactive C=C double bond which permits further modifications.

We have found that this object is achieved by polymers which have K values of from 20 to 140 and which contain structural units of the general formula:

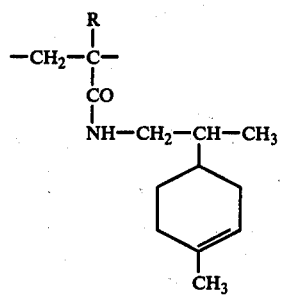

where R is H or $CH_3$.

Such polymers are macromolecular compounds of which the side branches contain optically active 2-(4-methyl-cyclohex-3-en-1-yl)-propyl groups, and which can accordingly also be optically active and contain unsaturated groups.

A further object of the invention is the preparation of such polymers.

We have found that this object is achieved by polymerizing unsaturated acrylyl or methacrylyl compounds of the general formula:

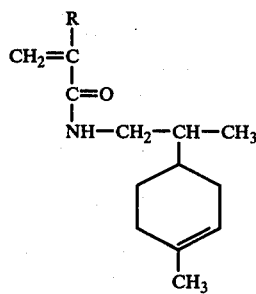

where R is H or $CH_3$, with or without one or more other olefinically unsaturated monomers, in the presence of free radical initiators at from 0° to 100° C.

Polymers with K values of from 20 to 140, preferably from 50 to 90, which contain structural units of the general formula defined at the outset, are macromolecular compounds which consist entirely or essentially or partially of recurring units of the formula:

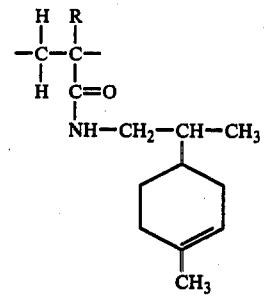

where the

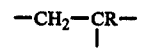

part of the formula is a part of the polymer chain. Accordingly, the general formula describes homopolymers, i.e. polymers which only contain the above structures as copolymerized units, as well as copolymers with compounds which are copolymerizable with the corresponding unsaturated compound

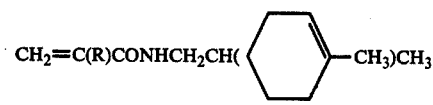

The K value is the technical parameter conventionally used to characterize the degree of polymerization of the polymer. The K values of the polymers of the invention were measured by the method of H. Fikentscher, Cellulosechemie 13 (1932) 58–64 and 71–74, in each case at 1 percent strength by weight in dimethylformamide, at 25° C.; $K = k \cdot 10^3$.

The polymers of the invention contain a 2-(4-methyl-cyclohex-3-en-1-yl)-propyl radical in the side chain. This group may be present in the optically active l(−) or d(+) form. Optical activity means the physical phenomenon that the solution of an optically active substance rotates the plane of linearly polarized light through a certain angle to the right (+) or to the left (−). The polymers of the invention may be present in solution in a dextro-rotatory, levo-rotatory or non-rotatory (d, l) form, depending on whether the substituted propyl radical is in the dextro-rotatory (+), the levo-rotatory (−) or the racemate form (d, l). These effects are known from the relevant literature and do not require further description here.

The relevant olefinically unsaturated acrylyl and methacrylyl compounds are those of the formulae I and II:

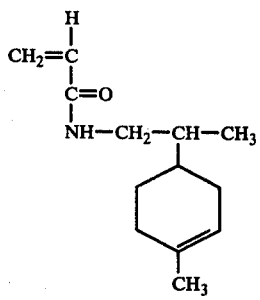
I

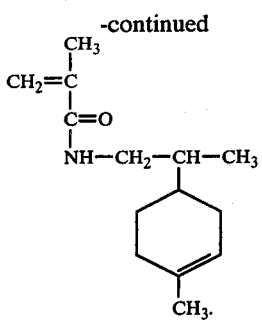

These can be prepared from the corresponding optically active 2-(4-methyl-cyclohex-3-en-1-yl)-propan-1-ol by reaction with one mole of acrylonitrile or methacrylonitrile in the presence of at least one mole of sulfuric acid. This conventional reaction is described, for example, in U.S. Pat. No. 3,277,056.

The monomers of the formulae I and II can each be homopolymerized. Of course, mixtures of compounds I and II can also be copolymerized. Furthermore, compounds I and/or II can be copolymerized with other olefinically unsaturated monomers.

When homopolymerizing or copolymerizing the compounds I and II, care must be taken that only the olefinically unsaturated double bond present in the acrylyl or methacrylyl group is polymerized, and not the C=C double bond contained in the cyclohexene radical. To ensure this, the polymerization is brought about at from 0° to 100° C., preferably from 40° to 85° C., suitably with reaction times of from 1 to 20, preferably from 2 to 10, hours.

Conventional free radical initiators are used for the polymerization. Examples of suitable initiators are hydrogen peroxide, organic hydroperoxides and peroxides, e.g. caproyl peroxide, lauroyl peroxide, tert.-butyl perbenzoate, dicumyl peroxide, p-menthane hydroperoxide, cumene hydroperoxide and succinic acid peroxide, as well as aliphatic azo compounds which decompose to free radicals under polymerization conditions, e.g. 2,2′-azo-bis-2,4-dimethylvaleronitrile, 2,2′-azo-bis-isobutyronitrile and analogous azonitriles, which are listed, for example, in J. Hine "Reaktivität and Mechanismus in der organischen Chemie", Verlag Georg Thieme, Stuttgart (1960), page 412, as well as conventional redox catalyst systems, e.g. the systems comprising potassium or ammonium persulfate and ascorbic acid, sodium hydrosulfite or iron-II salts.

The chelates of transition metals, which are known to form free radicals, are also suitable, e.g. chelates of manganese(III), cobalt(III), copper(II) and cerium(IV). In general, 1,3-dicarbonyl compounds are used as chelating agents. Specific examples are manganese(III) acetylacetonate and cobalt(III) ethyl acetoacetate. The polymerization can also be initiated by radiation, in the presence or absence of stabilizers, e.g. benzoin derivatives.

The initiators are in general used in an amount of from 0.05 to 5 percent by weight, preferably from 0.1 to 1.0 percent by weight, based on the amount of monomer. The optimum amount, and the most effective initiator, can easily be established experimentally.

The polymerization can be carried out as a mass polymerization. However, it is advantageously carried out in the presence of solvents or diluents. Examples of compounds suitable for this purpose are ketones, e.g. methyl ethyl ketone and methyl propyl ketone, ethers, e.g. diethyl ether, tetrahydrofuran and dioxane, and aliphatic, cycloaliphatic and aromatic hydrocarbons, e.g. hexane, heptane, cyclohexane, benzene and toluene; dimethylformamide is also very suitable.

The suspension or solution polymerization processes conventionally used for a plurality of other monomers or monomer mixtures are also suitable for the new process. The new process also does not differ from conventional processes in respect of the auxiliaries which may or may not be used, e.g. dispersants, protective colloids and the like.

The polymerization must be carried out at from 0° to 100° C., preferably from 40° to 85° C., the reaction time usually being from 1 to 20 hours, preferably from 2 to 10 hours. In general, the polymerization is carried out under atmospheric pressure, but superatmospheric pressures may also be employed. For copolymerizations with low-boiling comonomers, in particular, it is advisable to use superatmospheric pressures, in order to achieve a sufficient concentration of the comonomer in the reaction mixture.

The copolymerization of the olefinically unsaturated amides with ethylene or butadiene is advantageously carried out in aliphatic or aromatic solvents, by introducing the copolymerizable monomers into the solvent containing an initiator, and carrying out the polymerization at an elevated pressure, which, with ethylene as the comonomer, may be up to about 2,000 bars.

The copolymerization with acrylic esters is advantageously carried out in aromatic or aliphatic hydrocarbons, under the conventional conditions for the polymerization of acrylic esters.

Examples of suitable olefinically unsaturated monomers which can be copolymerized with the above optically active compounds of the formulae I and II are olefins, e.g. ethylene, propylene, butadiene and isoprene, styrene and substituted styrenes, e.g. α-methylstyrene, p-chlorostyrene and p-methylstyrene, acrylic esters and methacrylic esters, especially those of 1 to 18 carbon atoms, preferably of 1 to 8 carbon atoms, in the alcohol radical, e.g. acrylic or methacrylic monoesters of methanol, ethanol, butanol, ethylcyclohexanol, ethylene glycol, 1,2-propylene glycol, 1,3-propylene glycol, or 1,4-butylene glycol; acrylamide, methacrylamide and substituted amides, e.g. N-methylolacrylamide, or their esters, e.g. N-methylolacrylamide butyl ether and N-methylolmethacrylamide methyl ether; acrylonitrile and methacrylonitrile; vinyl esters, e.g. vinyl acetate and vinyl propionate; vinyl ethers, e.g. methyl vinyl ether, ethyl vinyl ether and alkyl vinyl ethers where alkyl is of 3 to 6 carbon atoms; and fumaric acid, maleic acid and itaconic acid, esters of these acids, and maleic anhydride. It is also possible simultaneously to copolymerize two or more of these compounds with the above optically active acrylamides or methacrylamides.

When preparing copolymers, the proportion of the new olefinically unsaturated monomers of the formulae I and II in the monomer mixture can vary within wide limits and can be, for example, from 1 to 99, especially from 5 to 80, preferably from 8 to 60, percent by weight based on the total weight of the monomers.

The polymers according to the invention, which have K values of from 20 to 140, preferably from 50 to 90, can still be methylolated, because they contain amide groups. They are used, for example, to prepare moldings, impact-resistant compositions, coatings or adhesives, for which purposes they may also be mixed with other plastics, e.g. with polyethylene, polypropylene or copolymers of vinyl acetate and ethylene. Because of their surfactant properties the polymers can inter alia also be used for finishing paper and textiles, and as special antistatic agents.

Since the polymers of the invention contain optically active groups, these products are also used as optical modifiers for plastic films.

Copolymers of the olefinically unsaturated optically active amides I and II with acrylic esters are also of particular interest industrially. These products are soluble, have a high molecular weight, are miscible with pigments and can be crosslinked with conventional crosslinking agents at relatively low temperatures. They are excellent antistatic agents.

In the Examples, parts and percentages are by weight.

EXAMPLE 1

Ethyl acrylate and the compound I are mixed in certain proportions, 0.1 percent by weight of azo-bis-isobutyronitrile is added in each case, and the mixtures are heated for 2 hours at 70° C.

The copolymers are precipitated with methanol, washed with methanol and dried for 10 hours in a reduced pressure drying oven at 60° C. under 12 mm Hg. The results obtained are listed in the Table which follows.

| No. | Ethyl acrylate Parts | Optically active compound I Parts | Conversion % | K value | Proportion of compound I, in per cent by weight |
|---|---|---|---|---|---|
| a | 9.9 | 0.1 | 100 | 91.5 | 0.9 |
| b | 9.5 | 0.5 | 100 | 98.0 | 5.0 |
| c | 9.0 | 1.0 | 98 | 97.5 | 9.8 |
| d | 8.5 | 1.5 | 99 | 99.5 | 14.8 |
| e | 8.0 | 2.0 | 96 | 98.5 | 19.8 |
| f | 7.0 | 3.0 | 100 | 87.5 | 29.9 |
| g | 6.0 | 4.0 | 105 | 89.5 | 39.8 |
| h | 5.0 | 5.0 | 98 | 86.5 | 49.9 |
| i | 4.0 | 6.0 | 100 | 89.5 | 60.0 |
| j | 2.5 | 7.5 | 98 | 84.0 | 74.9 |
| k | 1.0 | 9.0 | 95 | 88.0 | 90.0 |

EXAMPLE 2

A solution of 50 parts of toluene and 50 parts of a copolymer of ethyl acetate and compound I is prepared. 0.1 percent by weight of azo-bis-isobutyronitrile is added and the mixture is heated for 2 hours at 70° C.

The resulting solution is applied to a metal sheet and heated until dry. The surface coating is clear and soluble in acetone or toluene.

EXAMPLE 3

6 parts of styrene and 6 parts of compound II are polymerized in the presence of 0.1 part of azo-bis-isobutyronitrile for 8 hours at 70° C. The polymer has a K value of 66 and contains 50 percent by weight of copolymerized compound II. The conversion is 96%.

EXAMPLE 4

Butadiene, in an amount to give a butadiene pressure of 7 bars in the gas space, is injected into a vessel, above a solution of 150 parts of toluene, 10 parts of compound I and 1 part of azo-bis-isobutyronitrile, whilst stirring for 8 hours at 90° C. After this reaction time the polymer has a solids content of 27 percent by weight and a K value of 76, and contains 15.0 percent by weight of compound I.

EXAMPLE 5

If the procedure described in Example 4 is followed, but the butadiene is replaced by ethylene, a solution having a solids content of 30 percent by weight is obtained with a reaction time of 8 hours, a reaction temperature of 90° C. and an ethylene pressure of 235 atmospheres gauge in the gas space. The copolymer, which contains about 14.5 percent by weight of compound I, has a K value of 36 (measured on a 1% strength solution in decahydronaphthalene).

EXAMPLE 6

A solution of 100 parts of toluene, 10 parts of compound I, 270 parts of styrene and 3 parts of azo-bis-isobutyronitrile is heated at 90° C., whilst stirring. 280 parts of a copolymer having a K value of 34 (measured on an 0.5% strength solution in toluene) and containing 3.55 percent by weight of compound I are obtained.

EXAMPLE 7

6 parts of compound I are polymerized in the presence of 0.01 part of azo-bis-isobutyronitrile for 2 hours at 70° C. 6.0 parts of a homopolymer having a K value of 81 are obtained.

EXAMPLE 8

The procedure described in Example 7 is followed but using compound II as the monomer; 6.0 parts of a homopolymer having a K value of 54 are obtained.

We claim:

1. A polymer which has a K value of from 20 to 140 and which comprises structural units of the general formula

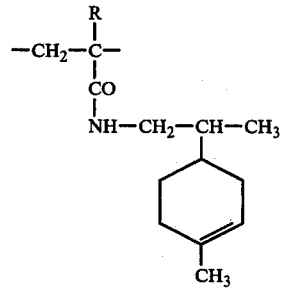

where R is H or CH₃.

2. A process for the preparation of a polymer which contains 2-(4-methyl-cyclohex-3-en-1-yl)-propyl groups and has a K value of from 20 to 140, wherein an olefinically unsaturated acrylic or methacrylic compound of the general formula

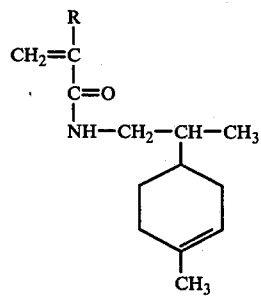

where R is H or CH₃ is polymerized, with or without one or more other olefinically unsaturated monomers, in the presence of a free radical initiator at from 0° to 100° C.

* * * * *